United States Patent
Krueger et al.

(10) Patent No.: US 6,881,242 B2
(45) Date of Patent: Apr. 19, 2005

(54) HYDROGEN RECLAMATION APPARATUS AND METHOD

(75) Inventors: Brett R. Krueger, Lebanon, OR (US); Johnny T. Ferara, Salem, OR (US); Gary D. McDowell, Albany, OR (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 10/340,949

(22) Filed: Jan. 13, 2003

(65) Prior Publication Data

US 2004/0134348 A1 Jul. 15, 2004

(51) Int. Cl.[7] .............................................. B01D 53/22
(52) U.S. Cl. ...................... 95/56; 96/4; 96/11; 55/356
(58) Field of Search .................. 95/45, 47–56; 96/4, 8, 10, 11; 55/356

(56) References Cited

U.S. PATENT DOCUMENTS

| | | | | |
|---|---|---|---|---|
| 3,344,582 A | * | 10/1967 | Merrill et al. | 95/56 |
| 3,450,500 A | * | 6/1969 | Setzer et al. | 423/653 |
| 4,180,552 A | * | 12/1979 | Graham et al. | 423/359 |
| 4,180,553 A | * | 12/1979 | Null et al. | 423/359 |
| 4,229,188 A | * | 10/1980 | Intille | 95/55 |
| 4,378,982 A | * | 4/1983 | McCombs | 96/117 |
| 4,474,586 A | * | 10/1984 | Rice | 95/55 |
| 4,690,695 A | * | 9/1987 | Doshi | 95/55 |
| 4,732,583 A | * | 3/1988 | DeLong et al. | 95/55 |
| 4,813,980 A | * | 3/1989 | Sircar | 95/101 |
| 4,881,953 A | * | 11/1989 | Prasad et al. | 95/41 |
| 5,034,125 A | * | 7/1991 | Karbachsch et al. | 210/321.8 |
| 5,125,937 A | * | 6/1992 | Sadkowski et al. | 96/8 |
| 5,348,592 A | | 9/1994 | Garg et al. | |
| 5,354,547 A | * | 10/1994 | Rao et al. | 423/650 |
| 5,429,662 A | * | 7/1995 | Fillet | 95/14 |
| 5,447,559 A | * | 9/1995 | Rao et al. | 96/4 |
| 5,676,736 A | * | 10/1997 | Crozel | 95/45 |

(Continued)

FOREIGN PATENT DOCUMENTS

| | | |
|---|---|---|
| DE | 42123070 | 10/1993 |
| JP | 58120502 | 7/1983 |

*Primary Examiner*—Robert H. Spitzer
(74) *Attorney, Agent, or Firm*—Kirkpatrick & Lockhart Nicholson Graham LLP

(57) ABSTRACT

An industrial system includes a processing region for treating an article in the presence of hydrogen and a hydrogen reclamation apparatus. In one embodiment, the hydrogen reclamation apparatus includes a compressor and a separation region having a hydrogen metal membrane. The compressor receives and compresses a hydrogen-containing output gas that is exhausted from the processing region. The compressed gas is conveyed to the separation region where it is separated into a permeate gas and a hydrogen-depleted raffinate gas. In one embodiment, the permeate gas is conveyed back to the processing region.

45 Claims, 5 Drawing Sheets

U.S. PATENT DOCUMENTS

| | | | |
|---|---|---|---|
| 5,730,777 A | * 3/1998 | Petersen et al. | 95/12 |
| 5,738,708 A | * 4/1998 | Peachey et al. | 95/56 |
| 5,753,010 A | * 5/1998 | Sircar et al. | 95/45 |
| 5,871,564 A | * 2/1999 | McCombs | 95/98 |
| 5,888,273 A | * 3/1999 | Buxbaum | 95/56 |
| 5,928,415 A | * 7/1999 | Girard et al. | 96/4 |
| 5,979,178 A | * 11/1999 | Engler et al. | 62/624 |
| 5,997,594 A | * 12/1999 | Edlund et al. | 48/76 |
| 6,007,763 A | 12/1999 | Bucker et al. | |
| 6,068,683 A | * 5/2000 | Carnes et al. | 96/4 |
| 6,126,726 A | * 10/2000 | Foley et al. | 96/11 |
| 6,171,574 B1 | * 1/2001 | Juda et al. | 423/648.1 |
| 6,179,900 B1 | * 1/2001 | Behling et al. | 95/45 |
| 6,179,902 B1 | * 1/2001 | Kawae et al. | 96/4 |
| 6,214,090 B1 | * 4/2001 | Dye et al. | 95/56 |
| 6,235,087 B1 | * 5/2001 | Chevalier et al. | 96/9 |
| 6,290,750 B1 | * 9/2001 | Ollivier et al. | 95/19 |
| 6,315,814 B1 | * 11/2001 | Barry et al. | 95/24 |
| 6,322,611 B1 | * 11/2001 | Engler | 95/55 |
| 6,419,726 B1 | * 7/2002 | Frost et al. | 95/56 |
| 6,482,251 B1 | * 11/2002 | Kawasaki et al. | 95/22 |
| 6,494,937 B1 | 12/2002 | Edlund et al. | |
| 6,511,521 B1 | * 1/2003 | Parchamazad | 48/128 |
| 2001/0045061 A1 | * 11/2001 | Edlund et al. | 48/76 |
| 2002/0083829 A1 | 7/2002 | Edlund et al. | |
| 2003/0056650 A1 | 3/2003 | Edlund et al. | |
| 2003/0056651 A1 | 3/2003 | Edlund et al. | |
| 2003/0164094 A1 | 9/2003 | Edlund et al. | |

* cited by examiner

HYDROGEN RECLAMATION APPARATUS AND METHOD

BACKGROUND OF THE INVENTION

The following systems utilizing various arrangements for separating hydrogen from gaseous mixtures are known:

Hydrogen recovery from steam-methane reformers through a pressure swing adsorption system (PSA) is described in U.S. Pat. Nos. 5,354,547, 5,447,559 and 5,753, 010. U.S. Pat. No. 4,813,980 describes recovery of nitrogen, hydrogen and carbon dioxide from hydrocarbon reformate using a multi-column PSA system.

U.S. Pat. No. 4,690,695 describes a gas separation process using one or more permeable membranes for bulk separation in combination with a PSA process for the recovery of hydrogen from mixtures with methane.

U.S. Patent Application Publication US 2001/0045061 describes a fuel processor with a hydrogen-producing region and a separation region that may include a hydrogen metal membrane.

Despite the known systems, there is a need for an efficient and versatile system to capture and purify hydrogen in other environments.

SUMMARY

One embodiment of the invention provides an industrial system that includes a processing region for treating an article in the presence of hydrogen. The industrial system includes a hydrogen reclamation apparatus having a compressor and a separation region with a hydrogen metal membrane. The compressor receives and compresses a hydrogen-containing output gas that is exhausted from the processing region. The compressed gas is conveyed to the separation region where it is separated into a hydrogen-rich permeate gas and a hydrogen-depleted raffinate gas. In one embodiment, the permeate gas is conveyed back to the processing region.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE INVENTION

Figure 1:
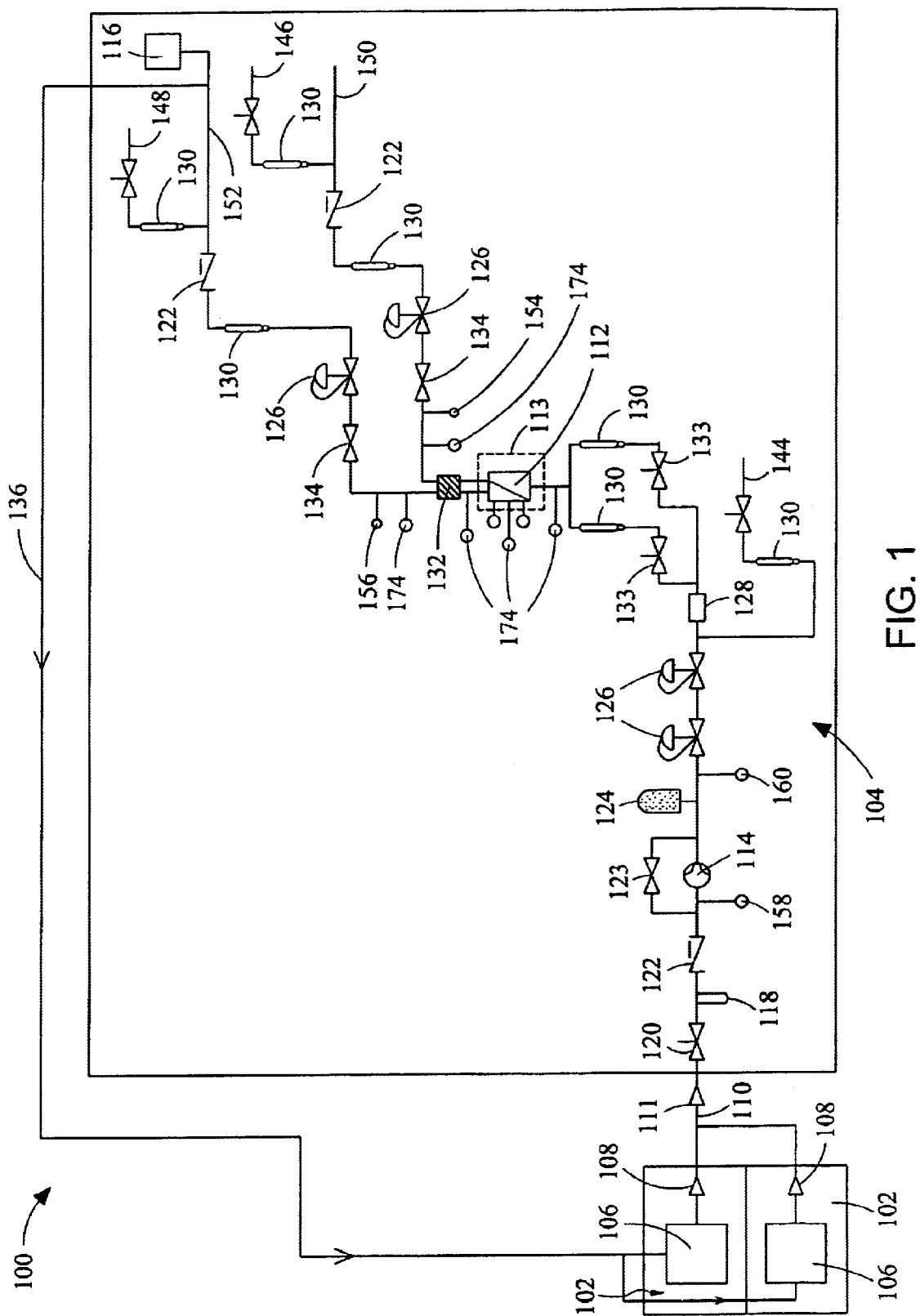
FIG. 1 is a diagram showing an embodiment of an industrial system according to the present invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upstream", or "downstream" are relative characterizations only based upon the particular position or orientation of a given component for a particular application.

FIG. 1 depicts an embodiment of an industrial system 100. The industrial system 100 may include at least one processing region 102, which carries out a process on an article in the presence of hydrogen, and a hydrogen reclamation apparatus 104 that includes a housing or frame 103, shown in FIG. 2. The processing region 102 may include a furnace or other heat treatment chamber 106 in which high-temperature processing of articles in the presence of hydrogen gas takes place. The furnace 106 may be, for example, an annealing furnace or a powder metal sintering furnace or any other high-temperature furnace. The processing region 102 may be adapted to carry out, for example, a continuous bright annealing process, a powder metal sintering process, or any other process in which a hydrogen-containing gas, such as pure hydrogen or hydrogen in combination with other gases, is used as a non-reacting atmosphere or otherwise during such process. The articles that are treated in the processing region may be parts or products, in various stages of manufacturing, as well as raw or bulk material. A waste gas containing hydrogen may be exhausted from an exhaust port 108 of the furnace 106 and directed to the hydrogen reclamation apparatus 104 at a waste gas port 111 connected to an infeed line 110. The waste gas from the infeed line 110 is passed through a separation region 113 that includes a hydrogen metal membrane (HMM) 112, such as, for example, the HMM described in U.S. Pat. No. 6,419,726, the entire contents of which are hereby incorporated herein by reference. Other HMMs may also be used to separate the hydrogen gas from the waste gas stream. The gas that passes through the HMM 112, hereinafter "permeate gas", is hydrogen separated from the waste gas stream. The permeate gas may be delivered back to the processing region 102 for continuous use or to a storage container 116 for future use or as a buffer to augment on demand gas delivery conditions to the processing region 102. Examples of applications in which stored hydrogen permeate gas may be used as a buffer include supplying on demand hydrogen for fuel cell systems requiring immediate load-following capability, or for replenishment in hydrogen-dependent batch processes in the production of powder metals, or for continuous process sintering or annealing furnaces where load/unload vestibules are activated resulting in volumetric discharge and loss of hydrogen gas.

In one embodiment, the hydrogen reclamation apparatus 104 may also include a compressor 114 on the infeed line 110 between the waste gas port 111 and the separation region 113. See FIGS. 1–3. The compressor 114 may be, for example, a diaphragm compressor that is rated for hydrogen service. Examples of other suitable compressors include, but are not limited to, oilless piston, rotary screw and water seal compressors. The compressor 114 may be used to increase the pressure of the waste gas from a low level, such as, for example, a pressure of the order of 0.03 MPa, to a level that is suitable for the efficient operation of the HMM 112 and which may be several orders of magnitude higher, such as, for example, a pressure of 4 MPa. The compressor 114 may be selected according to the manufacturer's specifications based on the properties of the waste gas stream and the desired operating conditions of the HMM 112, such as operating pressure, operating temperature and operating flux. A compressor throttle valve 123, such as a needle valve, may be connected to the compressor 114 to regulate the amount of pressure provided to the inlet port of the compressor 114, such that a positive pressure is maintained during operation, thereby preventing a vacuum condition and possible introduction of air into the reclamation system.

The industrial process in the processing region 102 may generate particulate matter, which may enter the waste gas stream and cause damage to many of the components of the hydrogen reclamation apparatus 104 or reduce the service life of those components. A pre-filter 118 may be connected to the infeed line 110 intermediate the processing region 102 and the compressor 114 to remove such particulate matter. The pre-filter 118 may be, for example, a canister filter having a replaceable filter cartridge, a self-cleaning filter or another type of particulate filter. The flow of the waste gas to the pre-filter 118 may be controlled by an isolation valve 120, such as, for example, a hand-operated ball valve or an automated valve. A one-way check valve 122a may be connected to the infeed line 110 to draw the filtered gas to the compressor 114.

In one embodiment, the hydrogen reclamation apparatus 104 may include surge suppression devices to reduce shock load to the HMM 112, to the compressor 114 or to other components of the hydrogen reclamation apparatus 104. The surge suppression devices may include, for example, an accumulator storage tank 124 and backpressure or dual stage regulators 126a downstream of the compressor 114. An inline filter 128 may also be connected to the infeed line 110 downstream of the compressor 114 to provide additional screening of particulates after compression.

Figure 2:
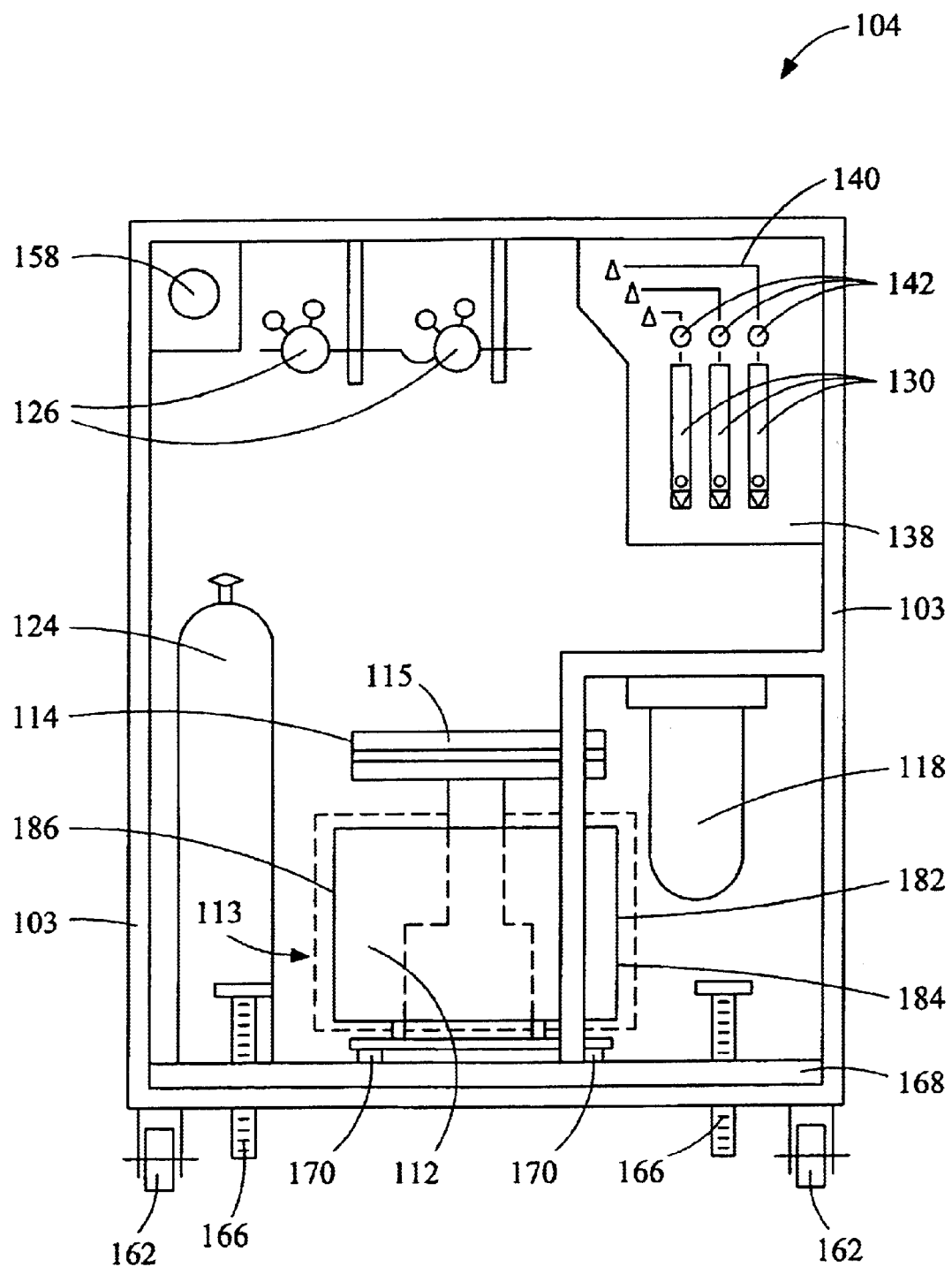
FIG. 2 is a left side view of an embodiment of a hydrogen reclamation apparatus for the industrial system of FIG. 1.
Figure 3:
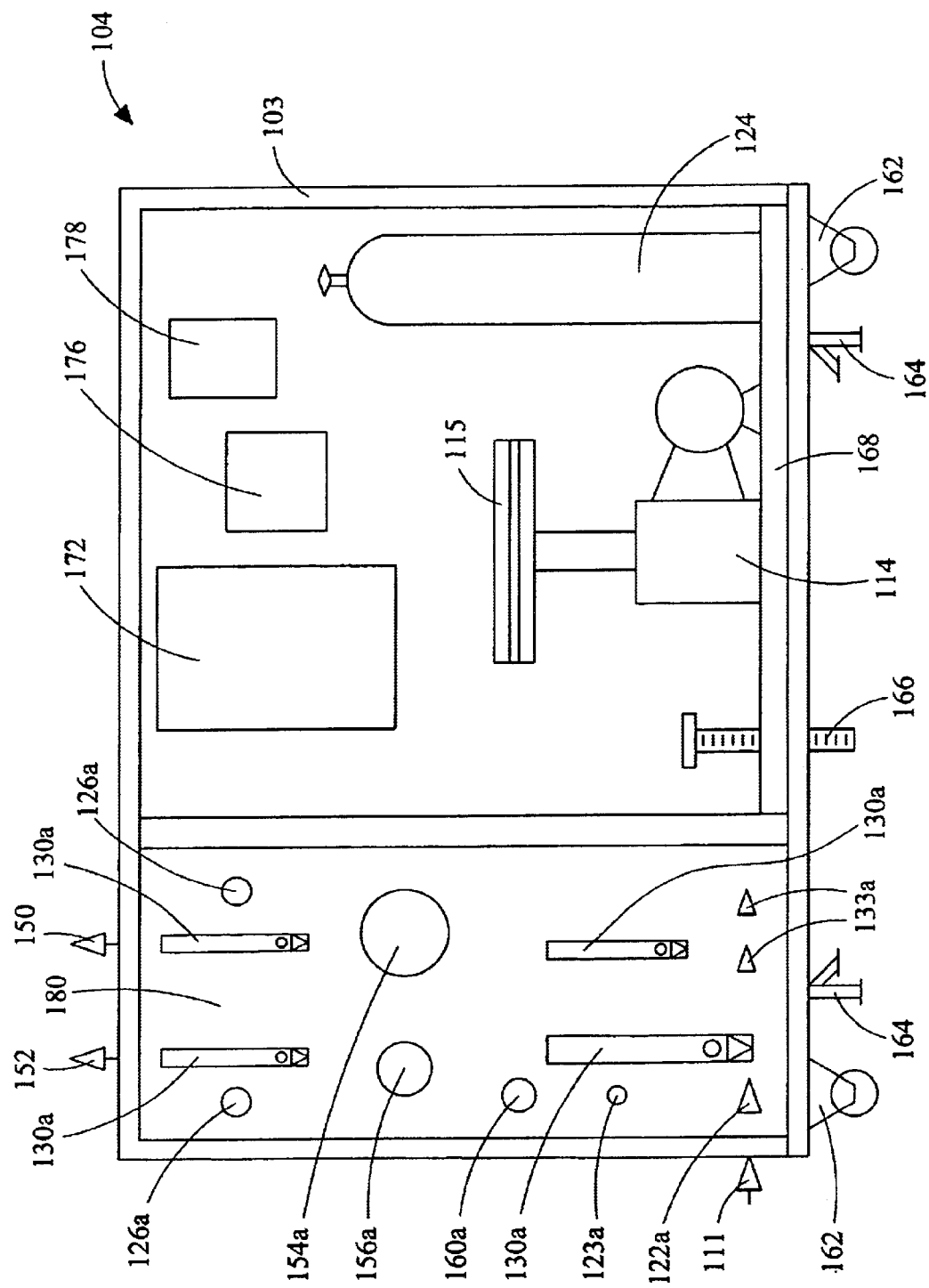
FIG. 3 is a front view of the hydrogen reclamation apparatus of FIG. 2.

The compressed waste gas may pass through a feed flow meter 130a, such as, for example, a rotameter, before entering the separation region 113 at feed port 186, shown in FIG. 2. In the separation region 113, hydrogen selectively passes through the HMM 112 and is separated from the waste gas stream. Following separation, two separate gas streams may exit the separation region 113, i.e., the permeate gas stream (purified hydrogen) through permeate port 182 and the "raffinate" gas stream (hydrogen-depleted waste gas) through raffinate port 184. One or more infeed flow meters 130a may be provided for handling different capacities of waste gas, such as, for example, high capacity and low capacity, that may result from different industrial processes serviced by the hydrogen reclamation apparatus 104, and to accurately measure infeed waste gas flows during periods of low flow or high flow conditions, for example during start up or shut down conditions versus steady state operation. Each of the flow meters 130a upstream of the separation region 113 may be controlled by a flow meter isolation valve 133a to select a flow meter with an appropriate flow capacity and accurately measure flow rates of the infeed waste gas stream.

In one embodiment, a heat exchanger 132 may be provided downstream of the separation region 113 to cool the raffinate and permeate gas streams, which, when exiting the separation region 113 may reach high temperatures, such as, for example, 400° F. The heat exchanger 132 may cool the raffinate and permeate gas streams to ambient temperature to avoid damage to the components downstream of the separation region 113. The heat exchanger 132 may be, for example, an immersion heat exchanger with coiled tubing. Other types of heat 2 exchangers 132, such as, for example, air-to-air, liquid-to-air, refrigerant-to-air, tube and shell, and plate and frame may also be used.

In one embodiment, the permeate and raffinate gas streams may be routed through separate backpressure regulators 126b, 126c respectively, which may be manual or automated, to control various pressure and flow parameters. Flash back arrestors 134b, 134c may also be provided for the permeate and raffinate gas streams to increase resistance to ignition in the presence of a hydrogen flame front. The permeate and raffinate gas streams may also be routed through flow meters 130b and 130c and one-way check valves 122b, 122c to prevent air from entering the hydrogen reclamation apparatus. The permeate gas stream may exit at a permeate output port 152 and may be routed through a return conduit 136 to the processing region 102 for re-use or to a storage tank 116. The raffinate gas stream may be exhausted to the atmosphere at raffinate output port 150.

In one embodiment, the hydrogen reclamation apparatus 104 may include a sample station 138 for taking samples of the waste, permeate and raffinate gases. See FIG. 2. The sample station 138 may include a sample gas control panel 140 with flow indicators 130d', 130e', 130f' connected to the flow rotameters 130d, 130e, 130f for the waste, raffinate and permeate gases respectively. Connection ports 142a, 142c, 142b to a gas chromatograph may also be provided for the waste sample port 144, the raffinate sample port 146 and the permeate sample port 148, respectively.

The hydrogen reclamation apparatus 104 may also include a raffinate pressure gauge 154, a permeate pressure gauge 156, a waste gas pressure gauge 158 upstream of the compressor 114, and a waste gas pressure gauge 160 downstream of the compressor 114. See FIG. 1.

In one embodiment, the hydrogen reclamation apparatus 104 may include a water vapor removal region 302 that includes water vapor removal devices to prevent vaporized water from condensing to liquid, thereby plugging system conduits or component orifices. See FIG. 5. Water vapor removal may be necessary when waste gas streams with high dew points are encountered, for example dew points>1° C. Water vapor removal devices may include, for example, coalescing filters, refrigeration cooling systems, or desiccant dryer absorption technology. The water vapor removal region 302 may be located at the entrance of the reclamation apparatus or concealed within the apparatus itself. Condensed water from within the reclamation system may be further removed in moisture removal regions 312 and 326 by water separation devices installed therein, such as, for example, separators or strainers, which serve to centrally collect and automatically discharge collected liquid water.

Figure 5:
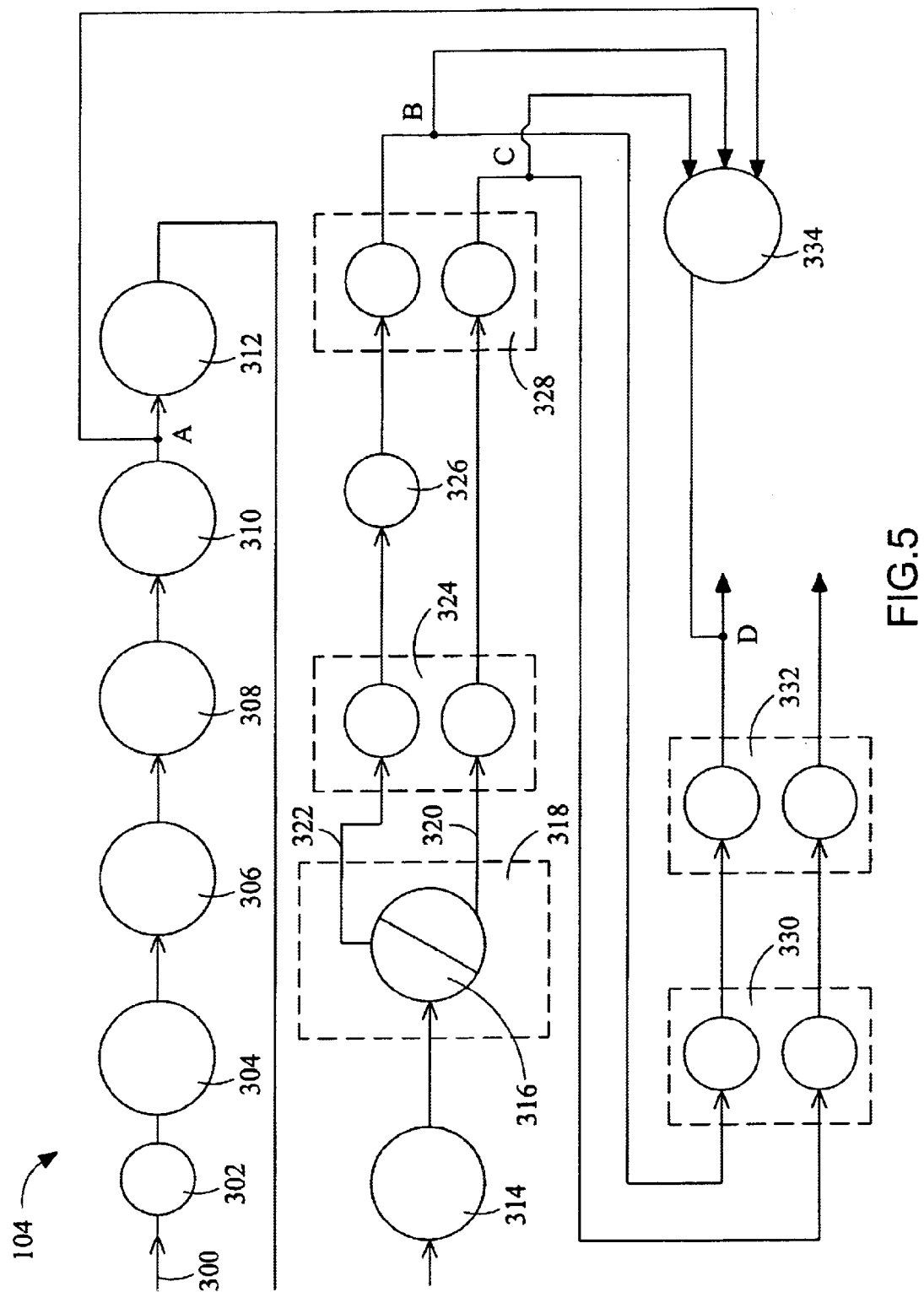
FIG. 5 is a diagram of an embodiment of a hydrogen reclamation apparatus according to the present invention.

FIG. 5 illustrates schematically an embodiment of the hydrogen reclamation apparatus 104 that incorporates a water vapor removal region 302 and two water/moisture removal regions 312, 326. The infeed waste gas stream 300 may enter a water vapor removal region 302 and successively pass through an infeed pressure and flow regulation region 304, a filtration region 306, a gas compression region 308, a surge suppression region 310, a moisture/water removal region 312 and an infeed flow measurement region 314, before reaching a heating region 318 that includes the hydrogen separation region 316 where the waste gas stream 300 is separated into a permeate gas stream 320 and a raffinate gas stream 322. The permeate gas stream 320 and the raffinate gas stream 322 may then pass through a cooling region 324. The waste gas stream 322 may also pass through a moisture removal region 326. The permeate gas stream 320 and the raffinate gas stream 322 may then pass through a flame (flash back) protection region 328, an exit pressure and flow regulation region 330 and a back flow protection region 332 before exiting the hydrogen reclamation apparatus 104. Sampling of the gas streams may be taken at various checkpoints, such as those indicated by A for the waste gas stream 300, B and D for the raffinate gas stream 322, and C for the permeate gas stream. The sampled gases may be directed to a gas sample panel 334.

In one embodiment, the hydrogen reclamation apparatus 104 may be equipped with roller casters 162 that are attached to the housing 103, and provide mobility and portability. See FIGS. 2 and 3. The hydrogen reclamation apparatus 104 may be easily transported or relocated to be in the proximity of the processing region 102. Such mobility is feasible because the design of the apparatus with the inclusion of the state-of-the-art HMM 112 as described above results in a compact and relatively lightweight apparatus 104 that can be supported on the roller casters 162 for transportation, and is, therefore, "portable". In one embodiment, the weight of the hydrogen reclamation apparatus 104 may be, for example, about 2500 lbs. Caster lifts 164 may also be provided to lift the hydrogen reclamation apparatus 104 off the roller casters 162 for stable support during operation. Additional levelers 166, such as, for example, jack-bolts, may also be attached to the housing 103 to provide additional means for leveling. In another embodiment, the hydrogen reclamation apparatus 104 may be fixed to a permanent location.

The hydrogen reclamation apparatus 104 may also include a base plate 168 that has appropriate thickness to reduce the vibration of the reciprocating motion of the compressor 114, and which is attached to the housing 103 to secure the compressor 114 against excessive vibration during operation. The compressor 114 may also be provided with a containment flange 115 to eliminate substantial compressor head deflection and damage to the internal diaphragms of the compressor. See FIG. 3. Additionally, the HMM 112 may be secured to the housing 103 with vibration isolation mounts 170 that may reduce the amount of vibration from the compressor 114 to the HMM 112. The vibration isolation mounts 170 may be made from a variety of materials including, for example, standard neoprene, highly-damped silicone elastomers, rubber, etc., and may also include metal components, such as springs, plates, spacers, etc.

In one embodiment, the hydrogen reclamation apparatus 104 may include an electrical control panel 172 for easy access and control of the electrical system of the apparatus 104. The electrical system may be designed to heat the HMM 112, and to monitor temperatures at various locations by means of, for example, thermocouples 174. The thermocouples 174 may be controlled by a selector switch 177 that may read multiple individual thermocouple outputs. See FIG. 3. The electrical system may also be designed to shut down the operation of the industrial system 100 in the event that a "temperature overload condition" occurs. The electrical system may operate with automated control, such as, for example, control provided by a programmable logic controller (PLC), computer control, remote or Internet control, control for interfacing to the furnace 106 of the processing region 102, etc. The electrical system may also include two temperature controllers 179 to control and monitor the HMM 112 heating cycle. The electrical system may also provide power to the compressor 114. A compressor start/stop button 176 may be included in the electrical control panel 172, or located in a separate control box. An hour meter 178 may also be provided with the electrical system.

In one embodiment, the hydrogen reclamation apparatus 104 may include a gas control panel 180 with dials or control checkpoints 130a', 130b', 130c', 126b', 126c', 156', 154', 160', 133a', 120', and 123' for controlling, respectively, the flow meters 130a, 130b, 130c, the permeate and raffinate back pressure regulators 126b and 126c, the permeate pressure gauge 156, the raffinate pressure gauge 154, the compressor infeed pressure gauge 160, the high and low infeed flow isolation valves 133a, the waste gas infeed isolation valve 120 and the compressor throttle valve 123 downstream the waste gas port 111. To further control the processing of the waste gas stream within the hydrogen reclamation apparatus 104, automated gas control devices, such as mass flow controllers, pressure transducers and mechanical valves, may be incorporated within the reclamation system. These components may be further coupled with an on site computer or with programmable logic controllers (PLC), or connected through the Internet for remote computer control and will be appreciated for continuous unattended operation.

The hydrogen reclamation apparatus 104 may be removably integrated into any industrial system 100 having a processing region that requires a continuous or batch influx of hydrogen and which produces a hydrogen-containing waste gas. It may also be integrated into one or more industrial systems 100 or used with multiple processing regions 102. The portability of the hydrogen reclamation apparatus 104 adds to its versatility and convenience for use with one or more industrial systems, concurrently or alternatively. Accordingly, the portable hydrogen reclamation apparatus 104 may be disconnected on demand from one industrial system 100 or processing region 102 and transported and connected to another industrial system 100 or processing region 102. Alternatively, the hydrogen reclamation apparatus 104 may simultaneously be connected to multiple processing regions 102 corresponding to one or more industrial systems 100.

Figure 4:
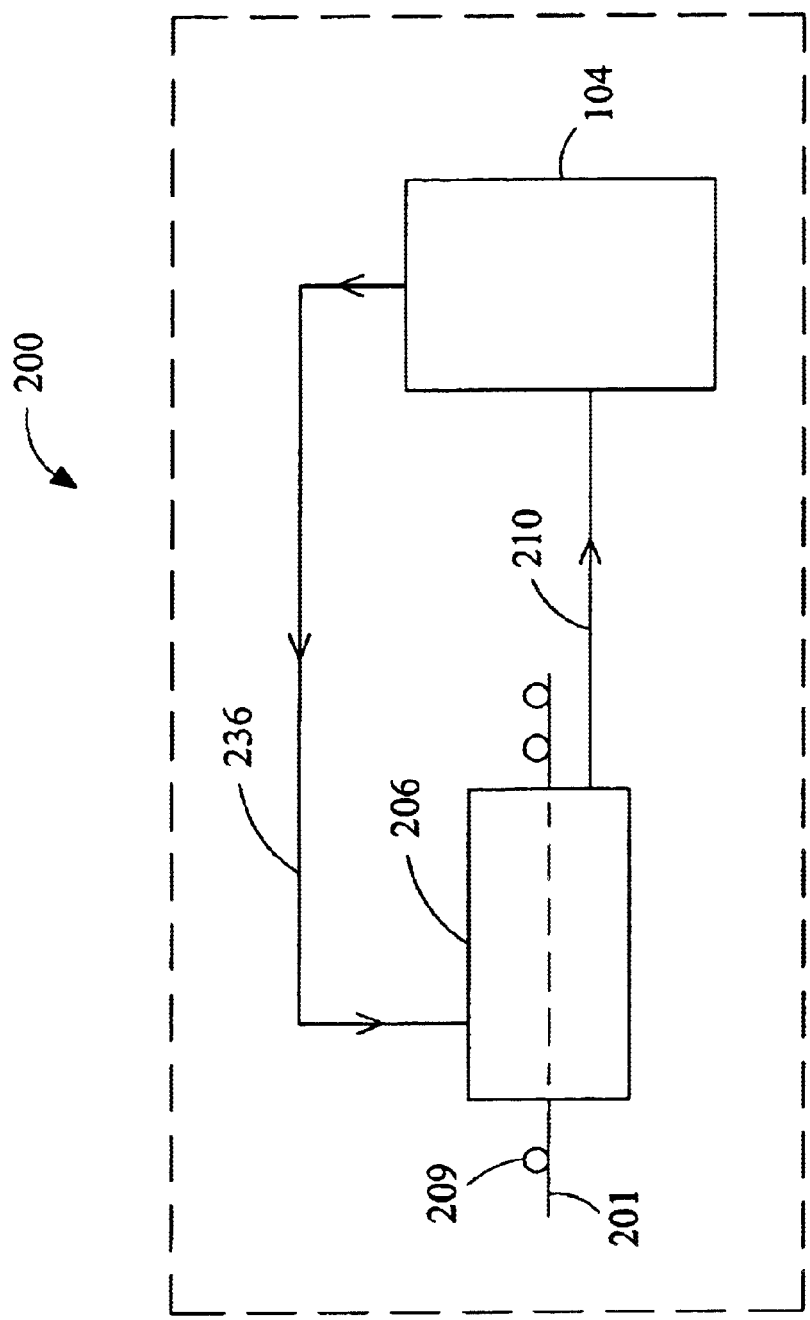
FIG. 4 is a diagram showing an embodiment of continuous annealing system according to the present invention.

The use of the hydrogen reclamation apparatus 104 in a continuous annealing system 200 is illustrated in FIG. 4. A track 201 conveys articles or material 209 to be processed into an annealing furnace 206 and removes the treated material from the furnace 206. The furnace 206 exhausts a hydrogen-rich waste gas, which is conveyed through an infeed conduit 210 to the hydrogen reclamation apparatus 104. The hydrogen reclamation apparatus 104 receives the output gas from the furnace 206, separates hydrogen gas from the waste gas stream and conveys the recovered hydrogen back to the furnace 206 through the return conduit 236 for re-use in the annealing process.

Similarly, the hydrogen reclamation apparatus 104 may be used in a powder metal sintering system or any other high-temperature processing system that operates in the presence of hydrogen. The hydrogen reclamation apparatus 104 may continuously replenish hydrogen losses through the waste stream, may be operated to supplement a separate hydrogen source, or may be used on demand to replace the separate hydrogen source.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit of the invention. The preceding description, therefore, is not meant to limit the scope of the invention. Rather, the scope of the invention is to be determined only by the appended claims and their equivalents.

What is claimed is:

1. A method for reclaiming hydrogen used in an industrial process for treating an article, wherein the industrial process utilizes a first processing region exhausting a hydrogen-containing output gas that is not produced by a catalytic reaction within the first processing region to a first exhaust region, the method comprising:
- connecting a hydrogen reclamation apparatus to the first exhaust region;
- compressing the output gas and outputting a compressed gas to the hydrogen reclamation apparatus;
- contacting a heated, hydrogen permeable membrane adjacent a wire mesh membrane with the compressed gas to provide a hydrogen-depleted raffinate gas and a permeate gas within the hydrogen reclamation apparatus; and
- conveying at least a first portion of the permeate gas to the first processing region.

2. The method of claim 1, wherein connecting hydrogen reclamation apparatus comprises transporting the hydrogen reclamation apparatus to the vicinity of the first processing region.

3. The method of claim 1, further comprising:
- connecting the hydrogen reclamation apparatus to a second exhaust region of a second processing region; and
- conveying a second portion of the permeate gas to the second processing region.

4. A method for reclaiming hydrogen used in an industrial process for treating an article, wherein the industrial process utilizes a first processing region exhausting a hydrogen-containing output gas that is not produced by a catalytic reaction within the processing region to a first exhaust region, the method comprising:
- connecting a hydrogen reclamation apparatus to the first exhaust region;
- contacting a heated, hydrogen permeable membrane adjacent a wire mesh membrane with the output gas to provide a hydrogen-depleted raffinate gas and a permeate gas within the hydrogen reclamation apparatus; and
- conveying at least a first portion of the permeate gas to the first processing region.

5. The method of claim 4, wherein connecting a hydrogen reclamation apparatus comprises transporting the hydrogen reclamation apparatus to the vicinity of the first processing region.

6. An industrial system, the system comprising:
- a processing region for treating an article in the presence of hydrogen, the processing region exhausting a hydrogen-containing output gas that is not produced by a catalytic reaction within the processing region; and
- a hydrogen reclamation apparatus comprising:
  - a compressor receiving at least a portion of the output gas and exhausting a compressed gas;
  - a separation region comprising a heated, hydrogen permeable membrane adjacent a wire mesh membrane, the separation region receiving the compressed gas and exhausting a permeate gas and a hydrogen-depleted raffinate gas; and
  - a fluid pathway conveying the permeate gas from the hydrogen reclamation apparatus to the processing region.

7. The industrial system of claim 6, wherein the hydrogen reclamation apparatus is a portable unit.

8. The industrial system of claim 6, wherein the processing region comprises an annealing furnace.

9. The industrial system of claim 8, wherein the annealing furnace is a continuous annealing furnace.

10. The industrial system of claim 8, wherein the annealing furnace is a batch-annealing furnace.

11. The industrial system of claim 6, wherein the processing region comprises a powder metal sintering furnace.

12. The industrial system of claim 11, wherein the sintering furnace is a continuous sintering furnace.

13. The industrial system of claim 11, wherein the sintering furnace is a batch sintering furnace.

14. The industrial system of claim 6, further comprising a pre-filter intermediate the processing region and the compressor.

15. The industrial system of claim 14, further comprising a water vapor separation region intermediate the processing region and the pre-filter.

16. The industrial system of claim 14, further comprising an accumulator intermediate the compressor and the separation region.

17. The industrial system of claim 14, further comprising a backpressure regulator intermediate the compressor and the separation region.

18. The industrial system of claim 6, further comprising an inline filter intermediate the compressor and the separation region.

19. The industrial system of claim 6, further comprising a moisture removal region intermediate the compressor and the separation region.

20. The industrial system of claim 6, further comprising a heat exchanger receiving the permeate gas and the raffinate gas.

21. The industrial system of claim 20, further comprising a flash back arrestor controlling the raffinate gas downstream the heat exchanger.

22. The industrial system of claim 20, further comprising a flash back arrestor controlling the permeate gas downstream the heat exchanger.

23. The industrial system of claim 22, further comprising a moisture removal region for the raffinate gas stream intermediate the heat exchanger and the flash back arrestor.

24. The industrial system of claim 20, further comprising a sample port accessing the raffinate gas downstream the heat exchanger.

25. The industrial system of claim 20, further comprising a sample port accessing the permeate gas downstream the heat exchanger.

26. The industrial system of claim 6, further comprising vibration isolation mounts supporting the hydrogen permeable membrane within the separation region.

27. The industrial system of claim 6, further comprising a second processing region exhausting a second hydrogen-containing output gas, the second hydrogen containing output gas received by the compressor.

28. An industrial system comprising:
- a first processing region wherein a first article is treated in the presence of hydrogen, the first processing region exhausting a first hydrogen-containing output gas that is not produced by a catalytic reaction within the processing region;
- a second processing region wherein a second article is treated in the presence of hydrogen, the second processing region exhausting a second hydrogen-containing output gas; and
- a hydrogen reclamation apparatus comprising:
  - a compressor receiving at least a portion of the first and second output gases and exhausting a compressed gas;
  - a separation region comprising a heated, hydrogen permeable membrane adjacent a wire mesh membrane, the separation region receiving the compressed gas and exhausting a permeate gas and a hydrogen-depleted raffinate gas; and a fluid pathway conveying portions of the permeate gas to the first and second processing regions.

29. The system of claim 28, wherein the hydrogen reclamation apparatus is a portable unit.

30. A continuous annealing system comprising:
   a furnace adapted to anneal an article in the presence of hydrogen and exhausting a hydrogen-containing output gas that is not produced by a catalytic reaction within the processing region;
   a track conveying the article to the furnace and removing the article from the furnace; and
   a hydrogen reclamation apparatus comprising:
   a compressor receiving at least a portion of the output gas and exhausting a compressed gas;
   a separation region comprising a heated, hydrogen permeable membrane adjacent a wire mesh membrane, the separation region receiving the compressed gas and exhausting a penetrate gas and a hydrogen-depleted raffinate gas; and
   a fluid pathway conveying the permeate gas to the furnace.

31. A portable hydrogen reclamation apparatus for use in an industrial system, the industrial system including a processing region exhausting a hydrogen containing output gas that is not produced by a catalytic reaction within the processing region, the reclamation apparatus comprising:
   a housing;
   a compressor supported by the housing, receiving the output gas and exhausting a compressed gas;
   a separation region including a heated, hydrogen permeable membrane adjacent a wire mesh membrane supported by the housing, the separation region receiving the compressed gas and exhausting a permeate gas and a hydrogen-depleted raffinate gas; and
   a fluid pathway conveying the permeate gas from the separation region to the processing region of the industrial system.

32. The apparatus of claim 31, further comprising an inline filter intermediate the compressor and the separation region.

33. The apparatus of claim 31, further comprising a heat exchanger receiving the permeate gas and the raffinate gas.

34. The apparatus of claim 33, further comprising a flash back arrestor controlling the raffinate gas downstream the heat exchanger.

35. The apparatus of claim 33, further comprising a flash back arrestor controlling the permeate gas downstream the heat exchanger.

36. The apparatus of claim 33, comprising a sample port accessing the raffinate gas downstream the heat exchanger.

37. The apparatus of claim 33, further comprising a sample port accessing the permeate gas downstream the heat exchanger.

38. The apparatus of claim 31, further comprising vibration isolation mounts supporting the hydrogen permeable membrane within the separation region.

39. The apparatus of claim 31, further comprising a water vapor removal region receiving the output gas upstream of the compressor.

40. The apparatus of claim 39, further comprising a first moisture removal region receiving the compressed gas.

41. The apparatus of claim 40, further comprising a second moisture removal region downstream the separation region receiving the raffinate gas.

42. A portable purification apparatus for use in an industrial system, the industrial system including a processing region exhausting a hydrogen containing output gas that is not produced by a catalytic reaction within the processing region, the purification apparatus comprising:
   a housing;
   a compressor supported by the housing, the compressor receiving the output gas and exhausting a compressed gas; and
   a separation region including a heated, hydrogen permeable membrane adjacent a wire mesh membrane supported by the housing, the separation region receiving the compressed gas and exhausting a permeate gas and a hydrogen-depleted raffinate gas.

43. The apparatus of claim 42, further including a region for storing the permeate gas.

44. An industrial system, the system comprising:
   a processing region for treating an article in the presence of hydrogen, the processing region exhausting a hydrogen-containing output gas that is not produced by a catalytic reaction within the processing region; and
   a hydrogen reclamation apparatus comprising:
   a separation region receiving at least a portion of the output gas and comprising a heated, hydrogen permeable membrane adjacent a wire mesh membrane, the separation region receiving the output gas and exhausting a permeate gas and a hydrogen-depleted raffinate gas; and
   a fluid pathway conveying the permeate gas from the hydrogen reclamation apparatus to the processing region.

45. The industrial system of claim 44, wherein the hydrogen reclamation apparatus is a portable unit.

* * * * *

UNITED STATES PATENT AND TRADEMARK OFFICE
CERTIFICATE OF CORRECTION

PATENT NO. : 6,881,242 B2
DATED : April 19, 2005
INVENTOR(S) : Krueger et al.

It is certified that error appears in the above-identified patent and that said Letters Patent is hereby corrected as shown below:

Column 3,
Line 62, delete "heat 2 exchangers" and substitute -- heat exchangers --.

Column 9,
Line 19, delete "penetrate" and substitute -- permeate --.

Signed and Sealed this

Twenty-eighth Day of February, 2006

JON W. DUDAS
*Director of the United States Patent and Trademark Office*